United States Patent
Bailey et al.

(10) Patent No.: US 7,076,569 B1
(45) Date of Patent: Jul. 11, 2006

(54) EMBEDDED CHANNEL ADAPTER HAVING TRANSPORT LAYER CONFIGURED FOR PRIORITIZING SELECTION OF WORK DESCRIPTORS BASED ON RESPECTIVE VIRTUAL LANE PRIORITIES

(75) Inventors: Joseph A. Bailey, Austin, TX (US); Joseph D. Winkles, Austin, TX (US); Norman M. Hack, Pflugerville, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 813 days.

(21) Appl. No.: 10/273,183

(22) Filed: Oct. 18, 2002

(51) Int. Cl.
*G06F 15/16* (2006.01)

(52) U.S. Cl. .......................... 709/250; 710/39; 710/52; 709/212

(58) Field of Classification Search ................ 709/250, 709/212; 710/39, 52; 719/311, 312
See application file for complete search history.

(56) References Cited

U.S. PATENT DOCUMENTS

| | | | |
|---|---|---|---|
| 6,459,698 B1* | 10/2002 | Acharya | 370/392 |
| 6,480,500 B1* | 11/2002 | Erimli et al. | 370/412 |
| 6,912,604 B1* | 6/2005 | Tzeng et al. | 710/52 |
| 2002/0150106 A1* | 10/2002 | Kagan et al. | 370/395.6 |
| 2004/0024903 A1* | 2/2004 | Costatino et al. | 709/238 |
| 2004/0042448 A1* | 3/2004 | Lebizay et al. | 370/362 |

OTHER PUBLICATIONS

Cassiday et al., "Hot Chips", *InfiniBand™ Architecture Tutorial*, Aug. 2000, pp. 1-79, InfiniBand™ Trade Association.

* cited by examiner

*Primary Examiner*—Frantz B. Jean
(74) *Attorney, Agent, or Firm*—Manelli Denison & Selter PLLC; Leon R. Turkevich

(57) ABSTRACT

An embedded host channel adapter includes a transport layer module, a transport layer buffer, and a link layer module. The transport layer buffer is configured for storing transmit packet entries for virtual lanes serviced by the embedded host channel adapter. The link layer module is configured for supplying virtual lane priority information and virtual lane flow control information, for each virtual lane, to the transport layer module. The link layer module also configured for constructing transmit packets to be transmitted based on retrieval thereof from the transport layer buffer. The transport layer module is configured for selecting one of the virtual lanes for servicing based on the supplied virtual lane priority information and virtual lane flow control information for each of the virtual lanes, enabling the transport layer module to prioritize received work notifications, for generation of respective transmit packet entries.

12 Claims, 3 Drawing Sheets

EMBEDDED CHANNEL ADAPTER HAVING TRANSPORT LAYER CONFIGURED FOR PRIORITIZING SELECTION OF WORK DESCRIPTORS BASED ON RESPECTIVE VIRTUAL LANE PRIORITIES

BACKGROUND OF THE INVENTION

1. Field of the Invention

The present invention relates to a host channel adapter configured for communication with target channel adapters in an InfiniBand™ server system.

2. Background Art

Networking technology has encountered improvements in server architectures and design with a goal toward providing servers that are more robust and reliable in mission critical networking applications. In particular, the use of servers for responding to client requests has resulted in a necessity that servers have an extremely high reliability to ensure that the network remains operable. Hence, there has been a substantial concern about server reliability, availability, and serviceability.

In addition, processors used in servers have encountered substantial improvements, where the microprocessor speed and bandwidth have exceeded the capacity of the connected input/output (I/O) buses, limiting the server throughput to the bus capacity. Accordingly, different server standards have been proposed in an attempt to improve server performance in terms of addressing, processor clustering, and high-speed I/O.

These different proposed server standards led to the development of the InfiniBand™ Architecture Specification, (Release 1.0), adopted by the InfiniBand™ Trade Association. The InfiniBand™ Architecture Specification specifies a high-speed networking connection between end nodes (e.g., central processing units, peripherals, etc.) and switches inside a server system. Hence, the term "InfiniBand™ network" refers to a private system area network (SAN) that connects end nodes and switches into a cluster within a server system, enabling the sharing of cluster resources. The InfiniBand™ Architecture Specification specifies both I/O operations and interprocessor communications (IPC).

A particular feature of InfiniBand™ Architecture Specification is the proposed implementation in hardware of the transport layer services present in existing networking protocols, such as TCP/IP based protocols. The hardware-based implementation of transport layer services provides the advantage of reducing processing requirements of the central processing unit (i.e., "offloading" processor code execution), hence offloading the operating system of the server system.

However, substantial concerns arise if attempts are made to embed an HCA into a processor core, for example as a processor configured for InfiniBand™ communications. In particular, a stand-alone HCA device may have a prescribed number of external pins for a memory interface configured for accessing external memory. However, adding the HCA memory interface, having the prescribed number of external pins, to a processor core that already has its own memory interface would result in an inefficient implementation having two memory interfaces, resulting in excessive pins, and a substantially higher packaging cost.

An additional concern when embedding an HCA into a processor core is the necessity of a small die size to reduce costs, resulting in a substantially smaller internal memory being available then if the HCA were implemented as a discrete device. However, conventional HCA architectures require substantially more memory for buffering between the Transport Layer and Link Layer transmit path (e.g., 256 kbytes) than typically would be permitted for an embedded HCA in a processor core (e.g., 16 kbytes).

The InfiniBand™ Architecture Specification requires that a packet sent via an HCA undergoes transport layer service, followed by link layer service, based on creation of a work queue entry (WQE) in system memory by an executable verbs consumer resource. Each work queue entry represents one message that needs to be transmitted for the verbs consumer resource. A message can be up to 2 gigabytes (GB) long; hence, a message may need to be broken down into packets that can be transmitted across the InfiniBand™ network. The size of the packet depends on the Maximum Transfer Unit (MTU) for the path to be used for transmitting the packet across the InfiniBand™ network: the MTU sizes may be 256, 512, 1024, 2048, or 4096 bytes. Hence, if an embedded HCA was only allocated 16 kbytes of memory for buffering between the Transport Layer and Link Layer transmit path, the HCA could only store four packets of the largest MTU size (4096).

Examples of operations performed during transport layer service (performed, for example, by a transport layer module) include constructing a transport layer header, generating a packet sequence number, validating service type, etc., based on detecting a work notification of the work queue entry created in the system memory. Examples of operations performed during link layer service (performed, for example, by a link layer module) include service layer and virtual lane mapping (SL-VL mapping), link layer flow control packet generation, link layer transmission credit checking, etc. Note that the transport layer module and the link layer module operate independently and in parallel; hence, the transport layer module attempts to supply the link layer module with packets to transmit, typically by constructing the packets and depositing the packets in an output buffer, while the link layer module continually withdraws packets from the output buffer and transmits them onto the InfiniBand™ network. A particular concern is that the HCA is able to continually transmit packets to keep the link "busy" and avoid gaps on the link (i.e., avoid "dead time" on the link).

Typically the transport layer module would service work queue entries by sequential processing of the respective work notifications, using a first in first out arrangement. However, the link layer operations within the HCA are configured for transmitting InfiniBand™ packets according to virtual lane prioritization. In particular, the InfiniBand™ Architecture Specification defines the virtual lanes as the means to implement multiple logical flows over a single physical link. An HCA may support up to 16 different virtual lanes, where each virtual lane has its own corresponding set of buffer resources, including link level flow control. Link level flow control in an InfiniBand™ network utilizes a token based system, where a link partner (e.g., a channel adapter or a switch) sends flow control tokens to the transmitting channel adapter each time the buffer space is freed in the link partner. If the transmitting channel adapter does not have sufficient flow control tokens to accommodate an entire packet for a given virtual lane, the transmitting channel adapter cannot send any more packets for the virtual lane until more flow control tokens have been received.

Hence, if an embedded HCA allocated a 16 kB output buffer has four stored packets, each of the maximum MTU size (4096 bytes), and the virtual lanes for those packets do not have enough flow control tokens, the link layer module would need to wait until more tokens are received for those virtual lanes before transmitting the data packets. In addition, if one attempted to store at least one 4 kB packet for each of the sixteen (16) supported virtual lanes, the size of the output buffer would expand to 64 kB, instead of the allowed 16 kB.

The problem is further compounded if storage of multiple packets for each virtual lane is preferred in the case where the link layer utilizes a virtual lane high/low priority table. In particular, each entry in the virtual lane high/low priority table specifies the virtual lane that should be serviced next, and the weight of the virtual lane, in terms of how many bytes should be transmitted onto the virtual lane before moving to the next entry in the table. Hence, it may be desirable that the output buffer stores more than one packet for each virtual lane, to enable each virtual lane to utilize the bandwidth allocated according to the virtual lane high/low priority table. Hence, if four packets (each having an MTU size of 4 kB) were allocated to each of the 16 virtual lanes, the resulting output buffer size would be 256 kB, substantially higher than the 16 kB buffer contemplated for the embedded HCA.

SUMMARY OF THE INVENTION

There is a need for an arrangement that enables a host channel adapter to be embedded in a processor core in an efficient and economical manner.

There also is a need for an arrangement that minimizes the number of additional interface pins needed for embedding an HCA into a processor.

These and other needs are attained by the present invention, where an embedded host channel adapter includes a transport layer module, a transport layer buffer, and a link layer module. The transport layer buffer is configured for storing transmit packet entries for virtual lanes serviced by the embedded host channel adapter. The link layer module is configured for supplying virtual lane priority information and virtual lane flow control information, for each virtual lane, to the transport layer module. The link layer module also configured for constructing transmit packets to be transmitted based on retrieval thereof from the transport layer buffer. The transport layer module is configured for selecting one of the virtual lanes for servicing based on the supplied virtual lane priority information and virtual lane flow control information for each of the virtual lanes, enabling the transport layer module to prioritize received work notifications, for generation of respective transmit packet entries, ensuring the link layer module can transmit the transmit packets in compliance with the virtual lane prioritization. Moreover, the selection by the transport layer of virtual lanes for servicing ensures transmit packet entries are generated in a sequence that complies with virtual lane prioritization requirements, eliminating the necessity of separate buffers for respective virtual lanes.

One aspect of the present invention provides a method in an embedded host channel adapter. The method includes first receiving, by a transport layer module, service level-virtual lane mapping information; second receiving, by the transport layer module from a link layer module, virtual lane priority information and virtual lane flow control information for each of a plurality of virtual lanes; and third receiving, by the transport layer module, work notifications for servicing of work descriptors for queue pairs, each queue pair having an identifiable service level. The method also includes selecting, by the transport layer module, one of the virtual lanes for servicing at least one of the work descriptors assigned to the selected one virtual lane, based on the corresponding virtual lane priority information and the corresponding virtual lane flow control information.

Another aspect of the present invention provides an embedded host channel adapter. The embedded host channel adapter includes a transport layer buffer configured for storing transmit packet entries for virtual lanes serviced by the embedded host channel adapter, a transport layer module, and a link layer module. The transport layer module is configured for selecting one of the virtual lanes for servicing based on supplied virtual lane priority information and virtual lane flow control information for each of the virtual lanes. The transport layer module also is configured for generating and storing in the transport layer buffer the transmit packet entries for the one virtual lane based on service level-virtual lane mapping information and received work notifications for servicing work descriptors for queue pairs having service levels mapped to the selected one virtual lane. The link layer module is configured for supplying the virtual lane priority information and the virtual lane flow control information. The link layer module also is configured for constructing transmit packets to be transmitted based on retrieval thereof from the transport layer buffer.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
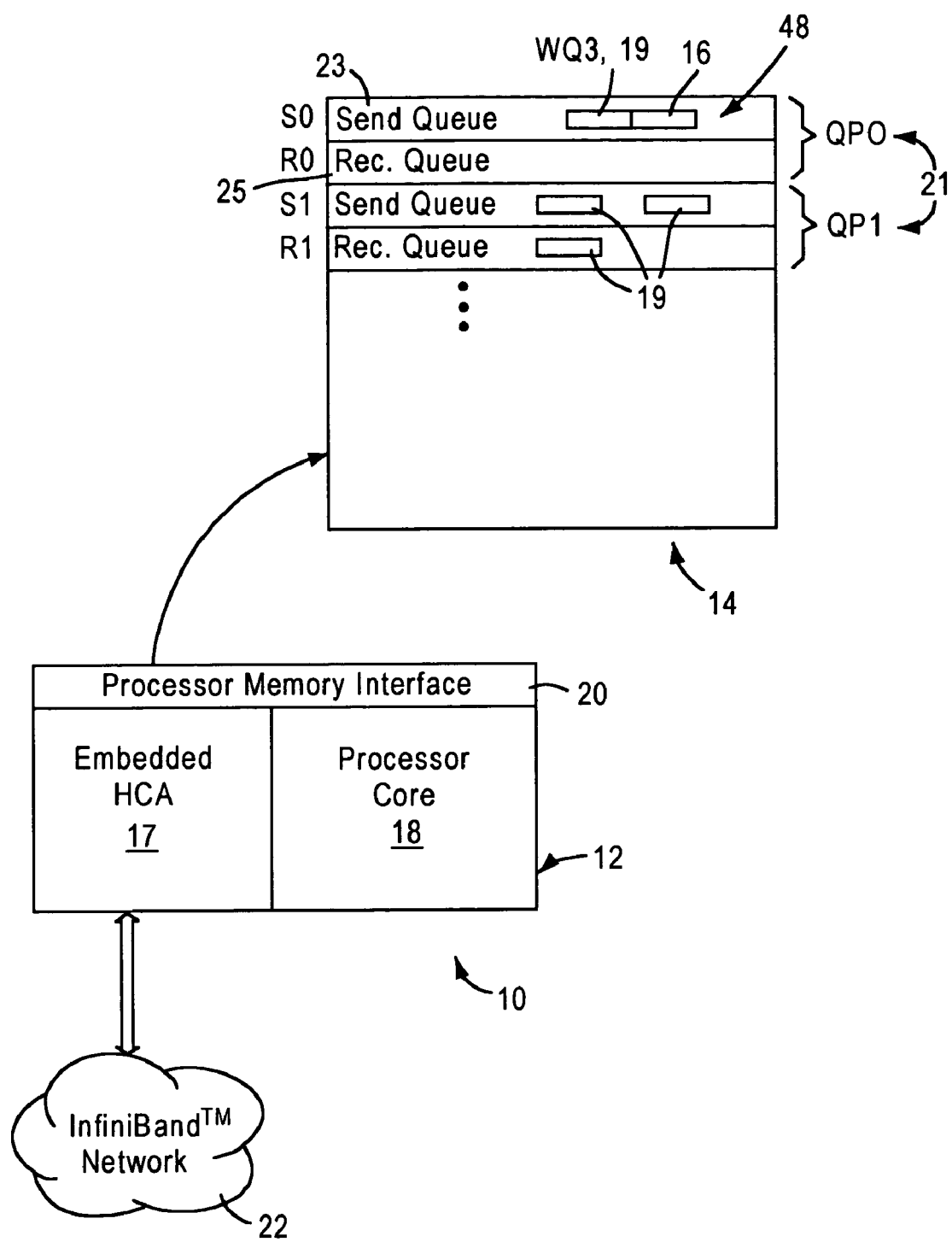
FIG. 1 is a diagram illustrating a processor based system having an embedded host channel adapter, according to an embodiment of the present invention.

FIG. 1 is a block diagram illustrating a processor system 10 having a processor 12 (i.e., processor device) implemented on a single chip, and a system memory 14 configured for storing processor based data (not shown) and transmit packet data, including payload data 16 to be transmitted by a host channel adapter 17. The processor device 12 includes a processor core 18, for example an Athlon™ based x86 compatible processor core commercially available from Advanced Micro Devices, Sunnyvale, Calif., and an embedded host channel adapter (HCA) 17. Both the processor core 18 and the embedded HCA 17 share a processor memory interface 20, enabling either the processor core 18 or the embedded HCA 17 to access the system memory 14 via the same interface 20.

The embedded HCA 17, compliant with the InfiniBand™ Architecture Specification, is configured for sending and receiving data packets to devices via the InfiniBand™ network 22. As described below, the embedded HCA 17 is configured for retrieving from system memory 14, via the processor memory interface 20, the payload 16 (e.g., "Payload 1") for a given packet to be transmitted, based on reception of a WQE 19 from a verbs consumer resource.

In particular, the embedded HCA 17 is configured for sending and receiving data packets on the InfiniBand™ network 22 based on work queue entries (WQEs) (i.e., work descriptors) stored in system memory 14. In particular, each verbs consumer process executed by the processor core 18 is assigned a corresponding queue pair 21 including a send queue 23 and a receive queue 25. Each verb consumer process requests work to be performed by the HCA 17, for example sending data to a destination, a remote direct memory access (RDMA) read operation, or an RDMA write operation, by sending the associated work descriptor 19 to the assigned send queue 23 or receive queue 25 in system memory 14. The verbs consumer process notifies the HCA 17 of the send queue entry 19 added to the send queue 23 (e.g., S0) by generating a work notification 42 (illustrated with reference to FIG. 2) for the corresponding work descriptor 19. Hence, the work notification 42, also referred to as a "doorbell", is used by the verbs consumer process to notify the HCA 17 that there is work to be performed, specified by a work descriptor 19 stored in the assigned send queue 23 in system memory 14.

Figure 2:
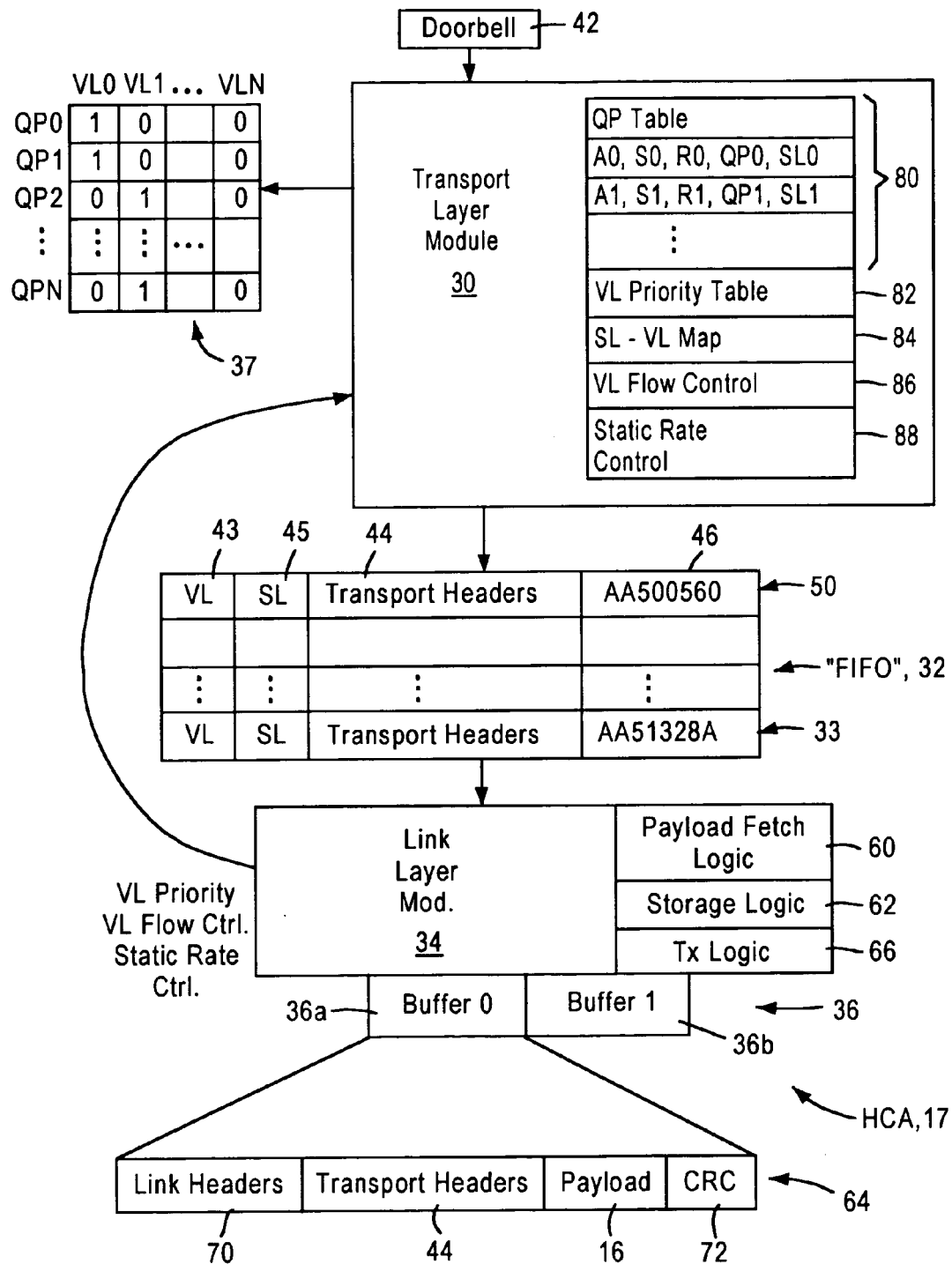
FIG. 2 is a diagram illustrating in detail the embedded host channel adapter of FIG. 1.

FIG. 2 is a diagram illustrating the embedded HCA 17, according to an embodiment of the present invention. The embedded HCA includes a transport layer module 30, a transport layer buffer 32, a link layer module 34, a link layer buffer 36, and a queue pair bitmap 37. The transport layer buffer 32 is configured for storing multiple transmit packet entries 50, where each transmit packet entry 50 includes selected portions of a Local Route Header, namely the virtual lane (VL) field 43 and the service level (SL) field 45; each transmit packet entry 50 also includes transport layer headers 44 and an identifier 46 that specifies a stored location in memory 14 of a payload 16 for the transport layer headers 44.

The transport layer module 30 includes a queue pair attributes table 80, a virtual lane priority table 82, an SL-VL map 84, a virtual lane flow control table 86, and a static rate control table 88. The queue pair attributes table 80 is configured for storing queue pair context entries. Each queue pair context entry is stored in the queue pair attributes table 80 during creation of the corresponding queue pair 21 in system memory 14. The queue pair context entry includes any necessary information associated with the corresponding queue pair, for example notification address (A0), system memory address for a corresponding send queue (e.g., S0), system memory address location for receive queue (e.g., R0), queue pair number (e.g., queue QP0), as well as any additional transport related information, including service level (SL). Hence, the HCA 17 can determine the queue pair context for a received doorbell 42 based on the destination address (e.g., A0) used to write the doorbell 42 to the memory mapped address space utilized by the HCA 17 in accessing the processor memory interface 20.

The SL-VL map 84 is configured for specifying the mapping between service levels and a virtual lane to be used for transmission. In particular, each work descriptor 19 for a given queue pair has an associated service level, determined by the transport layer module based on the queue pair attributes stored in the queue pair table 80, or specified by a work descriptor 19 (e.g., in the case of an unreliable datagram). The InfiniBand™ Architecture Specification defines a service level (SL) attribute that permits a packet traversing the InfiniBand™ network 10 to operate at one of sixteen (16) service levels; virtual lanes, however, defined in the InfiniBand™ Architecture Specification, enable multiple logical flows to be implemented over a single physical link, where link level flow control can be applied to one virtual lane without affecting other virtual lanes. Typically the SL-VL mapping information may be provided by a software-based resource. Hence, the SL-VL map 84 enables the transport layer module 30 to map a WQE 19 for a given queue pair 21 to a specific virtual lane.

The transport layer module 30 is configured for responding to a received doorbell 42 by identifying the queue pair 21 associated with the doorbell 42, determining the virtual lane for the queue pair 21 based on the associated service level assigned to the queue pair 21, and setting a bit in the queue pair bitmap 37 to specify the availability of a pending work descriptor 19 for a queue pair 21 assigned to a specified virtual lane. Hence, the transport layer module, upon selecting a virtual lane for servicing, can determine from the queue pair bitmap 37 the queue pairs 21 for a given virtual lane that have WQEs 19 that need servicing.

The virtual lane priority table 82 is configured for storing weighted priority values for each of the virtual lanes serviced by the HCA 17. In particular, each entry in the virtual lane high/low priority table 82 specifies the virtual lane that should be serviced next, and the weight of the virtual lane, in terms of how many bytes should be transmitted onto the virtual lane before moving to the next virtual lane entry in the table. The virtual lane priority information for the virtual lane priority table 82 is supplied by the link layer module 34 and stored by the transport layer module 30 into the table 82. Hence, the transport layer module 30 can determine whether more than one packet can be serviced for a given virtual lane, enabling the transport layer module 30 to determine the number of packets that should be serviced for a selected virtual lane.

The virtual lane flow control table 86 is configured for storing the number of flow control credits for each virtual lane, as received by the link layer module 34. In particular, the link layer module 34 sends the virtual lane flow control information (i.e., number of flow control credits) to the transport layer module 30, for storage in the table 86. Hence, the transport layer module 30 is able to determine, from the table 86, the availability of flow control credits for a given virtual lane.

The static rate control table 88 is configured for storing, for each path of a virtual lane, static rate control information supplied by the link layer module 34, enabling the transport layer module 30 to determine whether transport along a specified path must be limited due to a limited link bit rate within the network 22. In particular, the InfiniBand™ Architecture Specification specifies a static rate control mechanism that prevents a port with a high-speed link from overrunning the capacity of a port with a lower speed link.

Hence, the transport layer module 30 is able to select which virtual lane should be serviced next, based on the information specified within the virtual lane priority table 82, the virtual lane flow control table 86, and the static rate control table 88. In particular, the transport layer module 30 determines from the table 82 what virtual lane should be serviced next, and how many bytes should be transmitted before moving on to the next virtual lane; the transport layer module 30 then determines from the virtual lane flow control credits 86 whether sufficient flow control credits exist to transmit all the bytes as specified by the VL priority table 82: if the table 86 indicates that the virtual lane has an insufficient number of flow control credits, the transport layer module 30 may selectively reduce the number of packets to be transmitted, or if necessary, skip the virtual lane entirely if there are insufficient flow control tokens for a single data packet. Assuming there are sufficient flow control tokens, the transport layer module 30 also checks the static rate control table 88 to determine whether any limitations exist for the static rate of injection for the selected virtual lane.

Hence, the transport layer module 30 selects the next virtual lane to be serviced, based on the weighted virtual lane priority, the availability of flow control credits for the corresponding virtual lane, and the static rate control information. Upon selecting the next virtual lane to be serviced (e.g., VL0), the transport layer module 30 access the queue pair bitmap 37 to identify all the queue pairs (e.g., QP0, QP1) 21 that have one or more work descriptors 19 to be serviced for the selected virtual lane.

The transport layer module 30 is configured for generating the transmit packet entries 50 by generating the corresponding transport layer headers 44; typically the WQE 19 will specify an identifier 46, also referred to as a pointer, that specifies the stored location 48 of the payload 16 for the transport layer header 44. As illustrated in FIG. 2, the transport layer module 30 generates the transport headers 44 for the payload 16 stored in system memory 14 at the stored location 48, illustrated in FIG. 2 as having a system memory address value "AA500560" (hexadecimal).

Note that the transport layer module 30 also is configured, in compliance with the InfiniBand™ Architecture Specification, to generate a packet sequence number, validating the service type (e.g., reliable connection, reliable datagram, unreliable connection, unreliable datagram, etc.), and other transport layer operations. In particular, the transport layer module 30 fetches the necessary context information from system memory 14 (e.g., queue pair context information, reliable datagram channel information, translation table information, etc.) each time it services a WQE 19 in order to determine how to build the transport headers 44, as well as calculate the physical addresses 48 for the payloads 16. The transport layer module 30 also generates portions of the local route header (LRH), including the virtual lane (VL) field 43 and the service level (SL) field 45. Hence, the transport layer module 30 eliminates the necessity for the link layer module 34 to perform any virtual lane arbitration. The transport layer module 30 stores the VL field 43, the SL field, 45, the transport headers 44 and the corresponding identifier 46 as an entry 50 in the transport layer buffer 32.

The storage of the identifier 46 with the associated transport headers 44 in the entry 50, in contrast to storing the actual payload 16, substantially reduces the storage requirements for the transport layer buffer 32. Hence, the transport layer buffer 32 may be implemented as an 8 kB buffer since a transmit packet entry 50 can have its size reduced from the MTU size of 4096 bytes down to as little as 40 bytes (note that the maximum size of the transport header 44 will be 122 bytes). Hence, the 8 kB transport layer buffer 32 has the capacity for storing at least 100 entries 50 for respective transmit packets, with the potential of holding as many as 400 entries 50, depending on the size of the header field 44 and the size of the pointer 46.

Since each doorbell 42 typically will require generation of multiple transmit packets 64, the transport layer module 30 will therefore have sufficient storage capacity in its transport layer buffer 32 to generate and store all the necessary transmit packets 64 for the corresponding doorbell 42, without requiring multiple accesses of associated context information from the system memory 14 via the shared memory interface. In particular, the transport layer module 30 can fetch the necessary context information (e.g., queue pair context information, reliable datagram channel information, translation tables, etc.), and generate all the associated transmit packets 64 from the single fetch cycle. In comparison, note that if the payload data was stored in the transport layer buffer (thus limiting the buffer 32 to storing only 1 transmit packet) the transport layer module 30 would be unable to generate all the necessary transmit packets for a corresponding doorbell 42 using a single fetch cycle, and therefore would require multiple fetch cycles via the processor memory interface 20 to build the next packet 64, reducing the HCA performance by limiting the packet throughput, and limiting access to the shared memory interface 20 by the processor core.

Hence, storage of the identifiers 46 in the transport layer buffer 32 enables the transport layer module 30 to build all the necessary transmit packets 64 for a doorbell 42 using a single fetch cycle of context information via the processor memory interface. Moreover, the transport layer module 30 can store the transmit packet entries 50 using a FIFO based sequence, since the transport layer module 30 has already arranged the transmit packet entries 50 according to virtual lane prioritization, flow control token availability, and static rate control requirements. Hence, the link layer module 34 can retrieve the next transmit packet entry at the output end 33 of the FIFO sequence.

The link layer module 34 includes payload fetch logic 60, storage logic 62 for storing a generated transmit packet 64 in the link layer buffer 36, and transmit logic 66 configured for transmitting a stored packet 64 onto the InfiniBand™ network 22. The payload fetch logic 60 fetches the payload 16 specified by the transmit packet entry 50 at the FIFO output end 33 of the buffer 32, via the processor memory interface 20 based on the corresponding identifier 46 (e.g., "AA51328A").

Upon retrieval of the payload 16, the link layer module 34 performs all necessary link layer operations in generating the data packet 64 according to the InfiniBand™ Architecture Specification, including generating the remainder of the link header 70 and cyclic redundancy check (CRC) fields 72 (e.g., Invariant CRC (ICRC) and Variant CRC (VCRC)).

The storage logic 62 is configured for storing the generated transmit packet 64 in an unused portion of the link layer buffer 36. As illustrated in FIG. 2, the link layer buffer 36 is partitioned into a first buffer portion 36a and a second buffer portion 36b each having a size of 4 kB for storing the prescribed maximum transfer unit size of 4 kB. The storage logic 62 is configured for utilizing an alternating storage sequence, alternating between the buffer portions 36a and 36b. Hence, the transmit logic 66 can transmit a stored transmit packet 64 (e.g., "Packet 0") from the first buffer portion 36a concurrently with the link layer module 34 fetching the payload 16 (e.g., "Payload 1") for generation of the subsequent packet 64 (e.g., "Packet 1") and storage thereof in the unused, second buffer portion 36b. Hence, the transmit logic 66 is able to continually transmit stored data packets, since the link layer module 34 can fetch the payload data 16 for the next packet in the time it takes to transmit the current packet.

Note that the buffer memory 36 also may be implemented as a wrap-around memory, wherein the link layer module 34 utilizes read/write pointers to identify the start and end locations of the stored packets 64.

Figure 3:
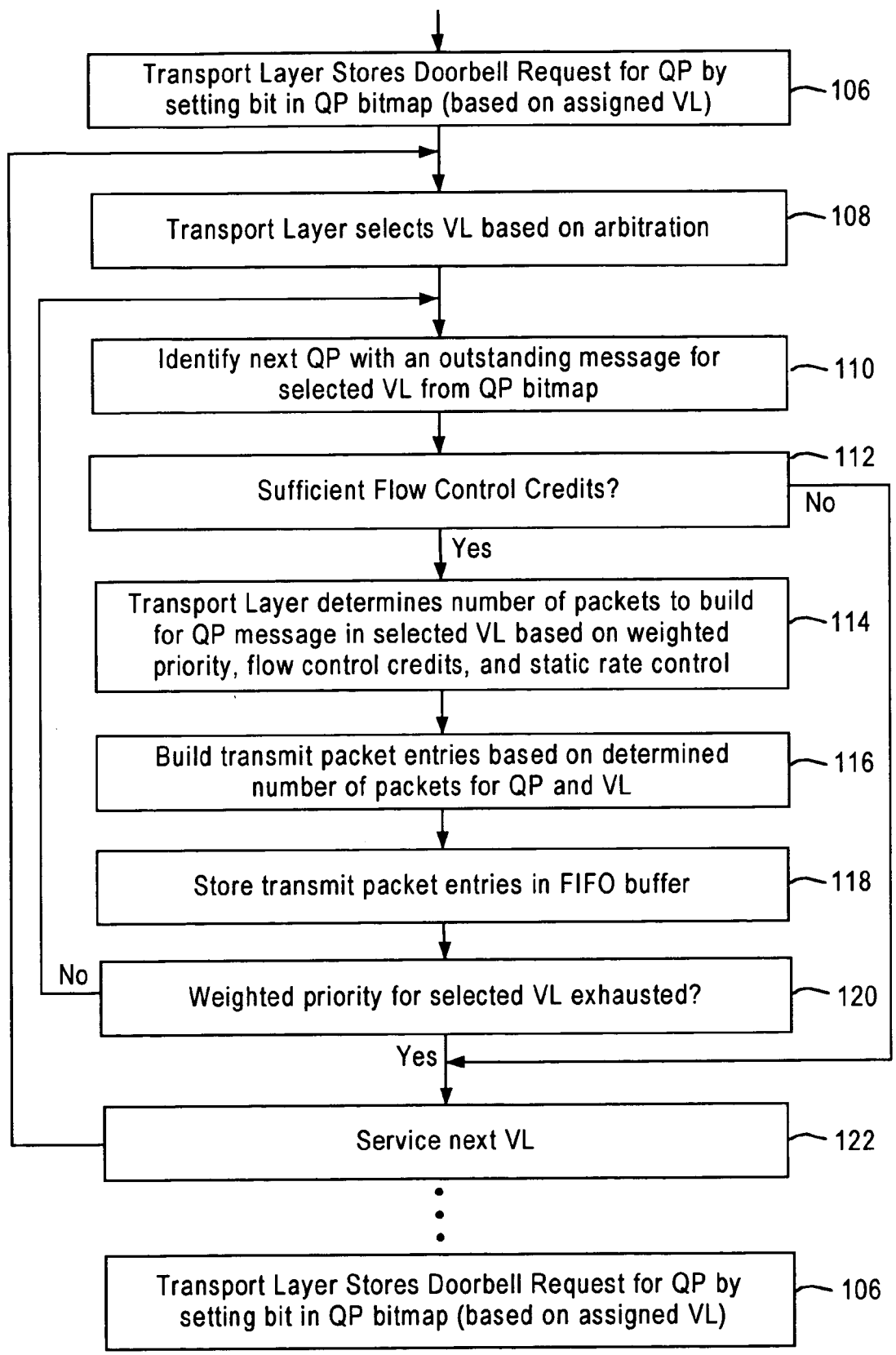
FIG. 3 is a diagram illustrating the method of transmitting packets by the embedded host channel adapter, according to an embodiment of the present invention.

FIG. 3 is a diagram illustrating the method in the embedded host channel adapter 17 of transmitting data packets based on virtual lane selection by the transport layer module 30, according to an embodiment of the present invention. As described above with respect to FIG. 2, the transport layer module 30 stores queue pair context entries with the associated attributes in the queue pair attributes table 80; the queue pair attributes (e.g., doorbell address A0, send queue address S0, receive queue address R0, queue pair identifier QP0, service level (SL)) are stored upon the creation of the corresponding queue pair 21.

The transport layer module 30 also receives service level to virtual lane mapping information, and stores the received information into the SL-VL map 84. As described above, the SL-VL mapping information may be received from the link layer module 34, or a verbs consumer resource.

As illustrated also in FIG. 2, the transport layer module also receives weighted virtual lane priority table information, virtual lane flow control information, and static rate control information from the link layer module 34; the transport layer module 30 stores the information in the VL priority table 82, the VL flow control table 86, and the static rate control table 88, respectively.

The method of FIG. 3 begins in step 106, where the transport layer 30, in response to receiving a doorbell request 42, stores the doorbell request 42 for the corresponding queue pair 21 by determining the assigned virtual lane, and setting the appropriate the in the queue pair bitmap 37.

The transport layer module 30 begins virtual lane selection in step 108 based on accessing the virtual lane priority table 82 to determine the next virtual lane to be serviced. The transport layer module 30 then identifies in step 110, from the queue pair bitmap 37, the next queue pair from the selected virtual lane that has an outstanding message to be sent, based on the corresponding bit being set. The transport layer module 30 checks in step 112 whether the selected virtual lane has sufficient flow control credits, as specified by the virtual lane flow control table 86. If the selected virtual lane does not have sufficient flow control credits for at least one data packet, the transport layer module 30 jumps to step 122 to select the next virtual lane.

Assuming the selected virtual lane has sufficient flow control credits for at least one data packet, the transport layer module 30 selects in step 114 the number of packets for the selected virtual lane based on the weighted priority (e.g., number of bytes specified for the selected virtual lane in the VL priority table 82), the number of flow control credits, and the static rate control information. The transport layer module 30 builds in step 116 the transmit packet entries based on the determined number of packets for the queue pair and virtual lane, and stores in step 118 the transmit packet entries 50 in the FIFO buffer 32. If in step 120 the weighted priority for the selected virtual lane has not yet been exhausted (i.e., more data bytes can be sent for that virtual lane), the transport layer module 30 repeats the process in step 110. Note that throughout the process, the transport layer module concurrently stores in step 106 doorbell requests that may be received concurrently during processing of the selected virtual lane.

According to the disclosed embodiment, the selection of the virtual lane by the transport layer module 30 substantially reduces the amount of local memory required for the embedded HCA 17 reducing costs for the processor device 12 without compromising performance.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in an embedded host channel adapter, the method comprising:
   first receiving, by a transport layer module, service level-virtual lane mapping information;
   second receiving, by the transport layer module from a link layer module, virtual lane priority information and virtual lane flow control information for each of a plurality of virtual lanes;
   third receiving, by the transport layer module, work notifications for servicing of work descriptors for queue pairs, each queue pair having an identifiable service level; and
   selecting, by the transport layer module, one of the virtual lanes for servicing at least one of the work descriptors assigned to the selected one virtual lane, based on the corresponding virtual lane priority information and the corresponding virtual lane flow control information.

2. The method of claim 1, wherein the second receiving step includes receiving, for an identified path of one of the virtual lanes, corresponding static rate control information that specifies a static rate of injection for the corresponding path, the selecting step including selecting the one virtual lane for servicing based on the corresponding static rate control information.

3. The method of claim 1, further comprising generating, by the transport layer module, a selected number of transmit packet entries for the one virtual lane based on the virtual lane priority information and the virtual lane flow control information, the selected number of transmit packet entries output, according to a first-in first-out (FIFO) sequence, into a buffer configured for storing the transmit packet entries for the plurality of virtual lanes, each transmit packet entry including transport layer information for the corresponding transmit packet.

4. The method of claim 3, further comprising:
   retrieving by the link layer module one of the stored transmit packet entries stored in the buffer according to the FIFO sequence; and
   generating and outputting by the link layer module a transmit packet based on the one stored transmit packet entry retrieved from the buffer.

5. The method of claim 3, wherein the third receiving step includes setting a bit within a queue pair bitmap, specifying an existence of the corresponding queue pair for an assigned virtual lane according to the specified service level and the service level-virtual lane mapping information, the generating step including accessing the work descriptors for the one selected virtual lane based on the identifying the respective bits set in the queue pair bitmap for the corresponding one selected virtual lane.

6. The method of claim 3, wherein the generating step includes inserting, in each transmit packet entry, a corresponding transport layer header, a pointer identifying a location of corresponding payload data in system memory, and at least a portion of a corresponding local route header for the transmit packet entry and including virtual lane information and service level information.

7. An embedded host channel adapter comprising:
   a transport layer buffer configured for storing transmit packet entries for virtual lanes serviced by the embedded host channel adapter;
   a transport layer module configured for selecting one of the virtual lanes for servicing based on supplied virtual lane priority information and virtual lane flow control information for each of the virtual lanes, the transport layer module configured for generating and storing in the transport layer buffer the transmit packet entries for the one virtual lane based on service level-virtual lane mapping information and received work notifications for servicing work descriptors for queue pairs having service levels mapped to the selected one virtual lane; and a link layer module configured for supplying the virtual lane priority information and the virtual lane flow control information, the link layer module configured for constructing transmit packets to be transmitted based on retrieval thereof from the transport layer buffer.

8. The embedded host channel adapter of claim 7, the link layer module is configured for supplying, to the transport layer module, static rate control information for an identified path of a corresponding virtual lane, the transport layer module configured for selecting the one virtual lane further based on the corresponding static rate control information.

9. The embedded host channel adapter of claim 7, wherein:

the transport layer module is configured for generating a selected number of the transmit packet entries for the one virtual lane based on the virtual lane priority information and the virtual lane flow control information; and the transport layer module is configured for storing the transmit packet entries in the transport layer buffer according to a first-in first-out (FIFO) sequence.

10. The embedded host channel adapter of claim 9, wherein the link layer module is configured for retrieving each stored transmit packet entry from the transport layer buffer, for generation of a corresponding transmit packet, according to the FIFO sequence.

11. The embedded host channel adapter of claim 9, further comprising a queue pair bitmap configured for identifying queue pairs relative to the virtual lanes, wherein:

the transport layer module is configured for setting a bit within the queue pair bitmap in response to receiving a work notification for servicing of a work descriptor for a corresponding queue pair, and based on the corresponding service level specified for the work descriptor and the corresponding service level-virtual lane mapping information; and the transport layer module is configured for accessing the work descriptors for the one selected virtual lane based on identifying the respective bits set in the queue pair bitmap for the corresponding one selected virtual lane.

12. The embedded host channel adapter of claim 9, wherein the transport layer module generates, for each transmit packet entry, a corresponding transport layer header, a pointer identifying a location of corresponding payload data in system memory, and at least a portion of a corresponding local router header for the transmit packet entry including virtual lane information and service level information.

* * * * *